May 21, 1929.  W. H. CRISWELL ET AL  1,713,889
VALVE
Filed July 23, 1927
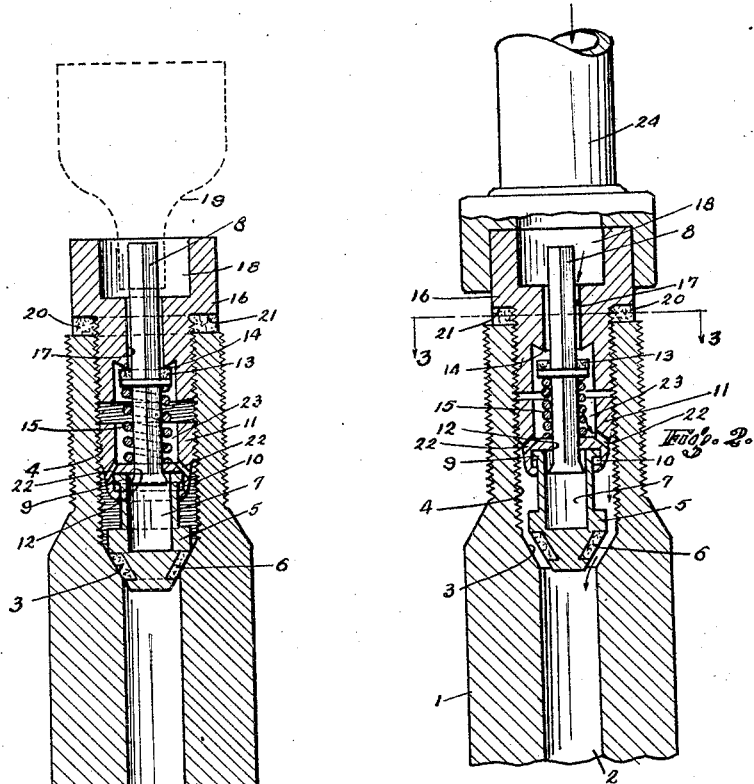
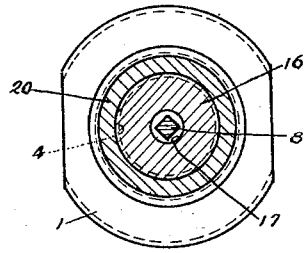
INVENTORS
WALTER HUDSON CRISWELL.
LESLIE WILLIAM BOND.
BY
ATTORNEYS.

Patented May 21, 1929.

1,713,889

UNITED STATES PATENT OFFICE.

WALTER HUDSON CRISWELL AND LESLIE WILLIAM BOND, OF SEATTLE, WASHINGTON.

VALVE.

Application filed July 23, 1927. Serial No. 207,931.

Our invention relates to improvements in valves, and it consists in the combinations, constructions and arrangements hereinafter described and claimed.

An object of our invention is to provide a valve for pneumatic tires, in which the seating member is held against the valve seat by a screw connection with the valve casing, instead of the usual spring actuated seating member.

A further object of our invention is to provide a device of the type described, in which the valve makes use of an auxiliary seating member which is spring actuated, and which also performs the additional function of moving the first seating member into operative or inoperative position.

Other objects and advantages will appear in the following specification, and the novel features of our invention will be particularly pointed out in the appended claims.

Our invention is illustrated in the accompanying drawing, forming a part of this application in which Figure 1 is a vertical section through the device;

Figure 2 is a similar section to Figure 1, but showing the parts in open position; and Figure 3 is a section along the line 3—3 of Figure 2.

In carrying out our invention we provide a valve casing 1, which has a bore 2 therein communicating with the interior of a pneumatic tire, not shown. The bore 2 is provided with a conical-shaped seat 3 and with an internally threaded enlarged bore 4, extending upwardly from the seat 3.

The valve seating members are linked together, so as to provide a double seal for the valve. One of the members is indicated by the reference numeral 5, and it will be noted from Figures 1 and 2 that this member has a conical-shaped seat 6, which is adapted to contact with the seat 3, as shown in Figure 1. The member 5 has a recess 7 therein, for receiving a square stem 8. The member 5 also has an outwardly turned flange 9, which is swiveled in an annular groove 10 in a screw plug 11. It will be noted from this construction that a rotation of the stem 8 will rotate the plug 11 and will raise or lower the member 5.

The square stem 8 is received in a square opening 12 in the plug 11, and is adapted to slide in this opening for permitting a valve seating member 13 to be moved against a valve seat 14, by means of a spring 15. The valve seat 14 forms a part of a sleeve 16.

The sleeve 16 slidably receives the stem 8 in a bore 17 and this bore is large enough to permit air to be forced through the sleeve. The top of the sleeve has a recess 18 which is large enough to permit the top end of a cap 19 to be inserted in the recess and to receive the top of the stem 8. A gasket 20 is disposed between a shoulder 21 on the sleeve 16, and the top of the valve casing 1.

Figures 1 and 2 show that there is sufficient space between the sleeve 16 and the plug 11 to permit the plug to be partially unscrewed for lifting the valve seat member 6 from the seat 3. Openings 22 are provided in the plug 11 and permit air to flow from a recess 23 in the plug to the space surrounding the valve seating member 5.

From the foregoing description of the various parts of the device, the operation thereof may be readily understood.

The parts as shown in Figure 1 are in closed position. The valve seating member 5 is firmly held in contact with the seat 3 by the plug 11, which bears down upon the member 5. The spring 15 bears against the plug 11 and against the valve 13, whereby the valve is securely held against its seat.

If now the driver wishes to force additional air into the casing 2, he removes the cap 19 from the casing 1 and inverts the cap, as shown in Figure 1, so that the small end of the cap will engage with the stem 8. A rotation of the cap will now rotate the stem and the stem in turn will partially unscrew the plug 11 so as to lift the valve seating member 5. The air hose 24 may now be placed upon the top of the sleeve 16 and the force of the air under pressure will open the valve 13, and thus provide a passage for the air from the air hose to the bore 2. A removal of the hose permits the spring 15 to instantly seat the valve 13 and thus cut off any leakage of air from the bore 2. The stem 8 may now be rotated for driving the valve seating member 5 against the seat 3, whereby the air will be checked by two valve seating members, one of them being closed by a spring and the other by a screw connection with the valve casing.

The improved valve will not leak, because it depends upon the force of the screw threads to press the valve member 5 against its seat, instead of utilizing the less positive force of a frail spring. Furthermore, this valve is much more durable, as it does not depend upon a delicately compounded soft rubber gasket, which deteriorates quickly. Road jars and centrifugal force will not affect this valve. Also, there are no delicate nibs to twist off, and so prevent the valve seating members from being removed. It is obvious that the device may be used for other purposes than for automobile tires.

Although we have shown and described one embodiment of our invention, it is to be understood that the same is susceptible of various changes and we reserve the right to employ such changes as may come within the scope of the appended claims.

We claim:

1. A tire valve comprising a casing, a valve seating member threadedly secured to said casing, a stem for rotating said member, a valve carried by said valve seating member, said casing having a valve seat therefor, a second valve carried by said stem and a valve seat removably carried by said casing for receiving said last named valve.

2. In a device of the type described, a valve seating member having a screw connection with a valve casing, a stem for rotating said member, a valve carried by said member and seating against said casing, a removable valve seat carried by said casing, and a valve carried by said stem for engaging with said last named seat.

3. A valve comprising a casing, a plug having a screw connection with said casing, a valve swiveled to said plug, said casing having a valve seat for said valve, a stem operatively connected to said plug for rotating it, a valve carried by said stem, a valve seat removably secured to said casing and adapted to receive the valve carried by said stem.

4. A device of the type described comprising a valve casing, a plug having a screw connection with said casing, a valve swiveled to said plug, a valve stem slidably disposed in said plug, and being adapted to rotate said plug when said stem is rotated, a valve seat removably secured to said casing and having a bore for receiving said stem, a valve carried by said stem, and spring means for forcing the valve carried by said stem into contact with said removable seat.

WALTER HUDSON CRISWELL.
LESLIE WILLIAM BOND.